(12) United States Patent
Yerramalli et al.

(10) Patent No.: US 11,057,873 B2
(45) Date of Patent: Jul. 6, 2021

(54) TECHNIQUES FOR LONG TERM EVOLUTION LICENSED ASSISTED-ACCESS(LTE LAA) COEXISTENCE WITH OTHER RADIO ACCESS TECHNOLOGIES

(71) Applicant: QUALCOMM Incorporated, San Diego, CA (US)

(72) Inventors: Srinivas Yerramalli, San Diego, CA (US); Peter Gaal, San Diego, CA (US); Tao Luo, San Diego, CA (US); Xiaoxia Zhang, San Diego, CA (US); Juan Montojo, San Diego, CA (US); Aleksandar Damnjanovic, Del Mar, CA (US); Marco Papaleo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 15/423,232

(22) Filed: Feb. 2, 2017

(65) Prior Publication Data
US 2017/0230943 A1 Aug. 10, 2017

Related U.S. Application Data

(60) Provisional application No. 62/292,095, filed on Feb. 5, 2016.

(51) Int. Cl.
*H04W 72/04* (2009.01)
*H04L 27/00* (2006.01)
(Continued)

(52) U.S. Cl.
CPC ......... *H04W 72/042* (2013.01); *H04L 1/1861* (2013.01); *H04L 5/0048* (2013.01);
(Continued)

(58) Field of Classification Search
CPC ............ H04W 72/0453; H04W 16/14; H04W 72/085; H04W 72/042; H04W 74/0816;
(Continued)

(56) References Cited

U.S. PATENT DOCUMENTS 9,883,404 B2    1/2018  Malladi et al.
2008/0076386 A1 3/2008  Khetawat et al.
(Continued)

FOREIGN PATENT DOCUMENTS

CN    104080117 A    10/2014
CN    104822160 A    8/2015
(Continued)

OTHER PUBLICATIONS

International Search Report and Written Opinion issued in International Patent Application No. PCT/US2017/016435, dated May 8, 2017 (14 pages).
(Continued)

*Primary Examiner* — Marsha D Banks Harold
*Assistant Examiner* — Dharmesh J Patel
(74) *Attorney, Agent, or Firm* — QUALCOMM Incorporated

(57) ABSTRACT

Apparatus and methods for long term evolution (LTE) licensed-assisted access (LAA) communications at a user equipment (UE) are described herein. In an aspect, an example method includes a user equipment (UE) receiving a radio resource control (RRC) message from an eNB and searching for a discovery reference signal (DRS) associated with a secondary cell (Scell) of the eNB based at least on the information received in the RRC message. The example method further includes transmitting on the channel detected during the search.

30 Claims, 7 Drawing Sheets

(51) Int. Cl.
*H04L 1/18* (2006.01)
*H04L 5/00* (2006.01)
*H04W 74/08* (2009.01)
*H04W 84/12* (2009.01)

(52) U.S. Cl.
CPC ..... *H04L 27/0006* (2013.01); *H04W 72/0453* (2013.01); *H04W 74/0816* (2013.01); *H04L 5/001* (2013.01); *H04W 84/12* (2013.01)

(58) Field of Classification Search
CPC .... H04W 84/12; H04L 27/2032; H04L 5/001; H04L 5/0091; H04L 1/1861; H04L 27/0006; H04L 5/0048
See application file for complete search history.

(56) References Cited

U.S. PATENT DOCUMENTS

| | | | |
|---|---|---|---|
| 2014/0140314 A1* | 5/2014 | Wei et al. | |
| 2014/0334320 A1* | 11/2014 | Liu | H04W 52/242 370/252 |
| 2015/0003356 A1* | 1/2015 | Seo | H04L 5/0048 370/329 |
| 2015/0092768 A1* | 4/2015 | Ng | H04W 48/16 370/350 |
| 2015/0223115 A1 | 8/2015 | Liang et al. | |
| 2015/0223243 A1* | 8/2015 | Tabet | H04W 28/085 370/330 |
| 2015/0365931 A1* | 12/2015 | Ng | H04L 1/1812 370/329 |

FOREIGN PATENT DOCUMENTS

| | | |
|---|---|---|
| CN | 105144614 A | 12/2015 |
| WO | 2014200951 A2 | 12/2014 |

OTHER PUBLICATIONS

LG Electronics et al., "WF on Scheduling in LAA," 3GPP Draft; R1-156178 WF Scheduling R1, 3rd Generation Partnership Project (3GPP), Mobile Competence Centre ; 650, Route Des Lucioles ; F-06921 Sophia-Antipolis Cedex ; France , vol. RAN WG1, No. Malmo, Sweden; Oct. 5, 2015-Oct. 9, 2015 Oct. 11, 2015 (Oct. 11, 2015), XP051044218, Retrieved from the Internet: URL:http://www.3gpp.org/ftp/tsg_ran/WG1_RL1/TSGR1_82b/Docs/ [retrieved on Oct. 11, 2015], 2 pages.

Mediatek Inc: "DRS Enhancements for RRM/CSI Measurements in LAA", 3GPP Draft, R1151941 RRM MEASUREMENTS_R1, 3rd Generation Partnership Project (3GPP), Mobile Competence Centre, 650, Route Des Lucioles, F-06921 Sophia-Antipolis Cedex, France, vol. RAN WG1, No. Belgrade, Serbia, Apr. 20, 2015-Apr. 24, 2015, Apr 19, 2015 (Apr. 19, 2015), pp. 1-5, XP050934795, Retrieved from the Internet: URL: http://www.3gpp.org/ftp/Meetings_3GPP_SYNC/RAN1/Docs/, [retrieved on Apr. 19, 2015].

ZTE: "Considerations on Measurements for LAA", 3GPP Draft, R1-151022 Considerations on Measurements for LAA, 3rd Generation Partnership Project (3GPP), Mobile Competence Centre, 650, Route Des Lucioles, F-06921 Sophia-Antipolis Cedex, France, vol. RAN WG1, No. Paris, France, Mar. 24, 2015-Mar. 26, 2015, Mar. 18, 2015 (Mar. 18, 2015), pp. 1-6, XP050951396, Retrieved from the Internet: URL: http://www.3gpp.org/ftp/tsg_ran/WG1_RL1/TSGR1_AH/LTE_LAA_1503/Docs/, [retrieved on Mar. 18, 2015].

* cited by examiner

TECHNIQUES FOR LONG TERM EVOLUTION LICENSED ASSISTED-ACCESS(LTE LAA) COEXISTENCE WITH OTHER RADIO ACCESS TECHNOLOGIES

CLAIM OF PRIORITY

The present application for patent claims priority to U.S. Provisional Patent Application No. 62/292,095, filed Feb. 5, 2016, entitled "Techniques for Long Term Evolution Licensed Assisted-Access (LTE LAA) Coexistence with other Radio Access Technologies," which is assigned to the assignee hereof, and hereby expressly incorporated by reference in its entirety herein.

INTRODUCTION

Aspects of this disclosure relate generally to telecommunications, and more particularly to techniques for long term evolution in unlicensed spectrum, e.g., LTE licensed-assisted access (LTE LAA) coexistence with other radio access technologies.

A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectively for communicating with one another.

Communication between devices in a wireless communication network may be subject to interference. For a communication from a first network device to a second network device, emissions of radio frequency (RF) energy by a nearby device may interfere with reception of signals at the second network device. For example, a Long Term Evolution (LTE) device operating in an unlicensed RF band that is also being used by a Wi-Fi device may experience significant interference from the Wi-Fi device, and/or can cause significant interference to the Wi-Fi device.

Some modes of communication may enable communications between an eNB and a user equipment (UE) over an unlicensed radio frequency spectrum, or over different radio frequency spectrum, e.g., a licensed radio frequency spectrum and/or an unlicensed radio frequency spectrum. With increasing data traffic in cellular networks that use a licensed radio frequency spectrum, offloading of at least some data traffic to an unlicensed radio frequency spectrum may provide a network operator with opportunities for enhanced data transmission capacity. An unlicensed radio frequency spectrum may also provide service in areas where access to a licensed radio frequency spectrum band is unavailable.

In some wireless networks, eNBs operating in the unlicensed spectrum, also referred to as LTE LAA eNBs, may be configured with channels that are different in bandwidth to the bandwidth of the channels used for Wi-Fi communications. As such, procedures may be desired for coexistence in such scenarios.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one example, a method of wireless communications is provided. The example method may include receiving, at a user equipment (UE), a radio resource control (RRC) message from an eNB, wherein the RRC message includes channel information that indicates a channel within a carrier located in an unlicensed spectrum and associated with a secondary cell (Scell) of the eNB for uplink transmissions to the eNB, and wherein a bandwidth of the channel is smaller than a bandwidth of the carrier; searching, by the UE, for a discovery reference signal (DRS) associated with the Scell based at least on the information received in the RRC message; and transmitting, from the UE, on the channel detected during the search.

In another example, an apparatus for wireless communications is provided. The example apparatus may include means for receiving, at a user equipment (UE), a radio resource control (RRC) message from an eNB, wherein the RRC message includes channel information that indicates a channel within a carrier located in an unlicensed spectrum and associated with a secondary cell (Scell) of the eNB for uplink transmissions to the eNB, and wherein a bandwidth of the channel is smaller than a bandwidth of the carrier; means for searching, by the UE, for a discovery reference signal (DRS) associated with the Scell based at least on the information received in the RRC message; and means for transmitting, from the UE, on the channel detected during the search.

In a further example, an apparatus for wireless communications is provided that may include a memory configured to store data; and one or more processors communicatively coupled with the memory. The one or more processors and the memory are configured to receive, at a user equipment (UE), a radio resource control (RRC) message from an eNB, wherein the RRC message includes channel information that indicates a channel within a carrier located in an unlicensed spectrum and associated with a secondary cell (Scell) of the eNB for uplink transmissions to the eNB, and wherein a bandwidth of the channel is smaller than a bandwidth of the carrier; search, by the UE, for a discovery reference signal (DRS) associated with the Scell based at least on the information received in the RRC message; and transmit, from the UE, on the channel detected during the search.

Additionally, in another example, a computer readable medium storing computer executable code for wireless communications is provided. The computer readable medium includes code for receiving, at a user equipment (UE), a radio resource control (RRC) message from an eNB, wherein the RRC message includes channel information that indicates a channel within a carrier located in an unlicensed spectrum and associated with a secondary cell (Scell) of the eNB for uplink transmissions to the eNB, and wherein a bandwidth of the channel is smaller than a bandwidth of the carrier; code for searching, by the UE, for a discovery reference signal (DRS) associated with the Scell based at least on the information received in the RRC message; and code for transmitting, from the UE, on the channel detected during the search.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components. If the first reference label is used in the specification, the description is applicable to any one of the similar components having the same first reference label irrespective of the second reference label.

DETAILED DESCRIPTION

Figure 1:
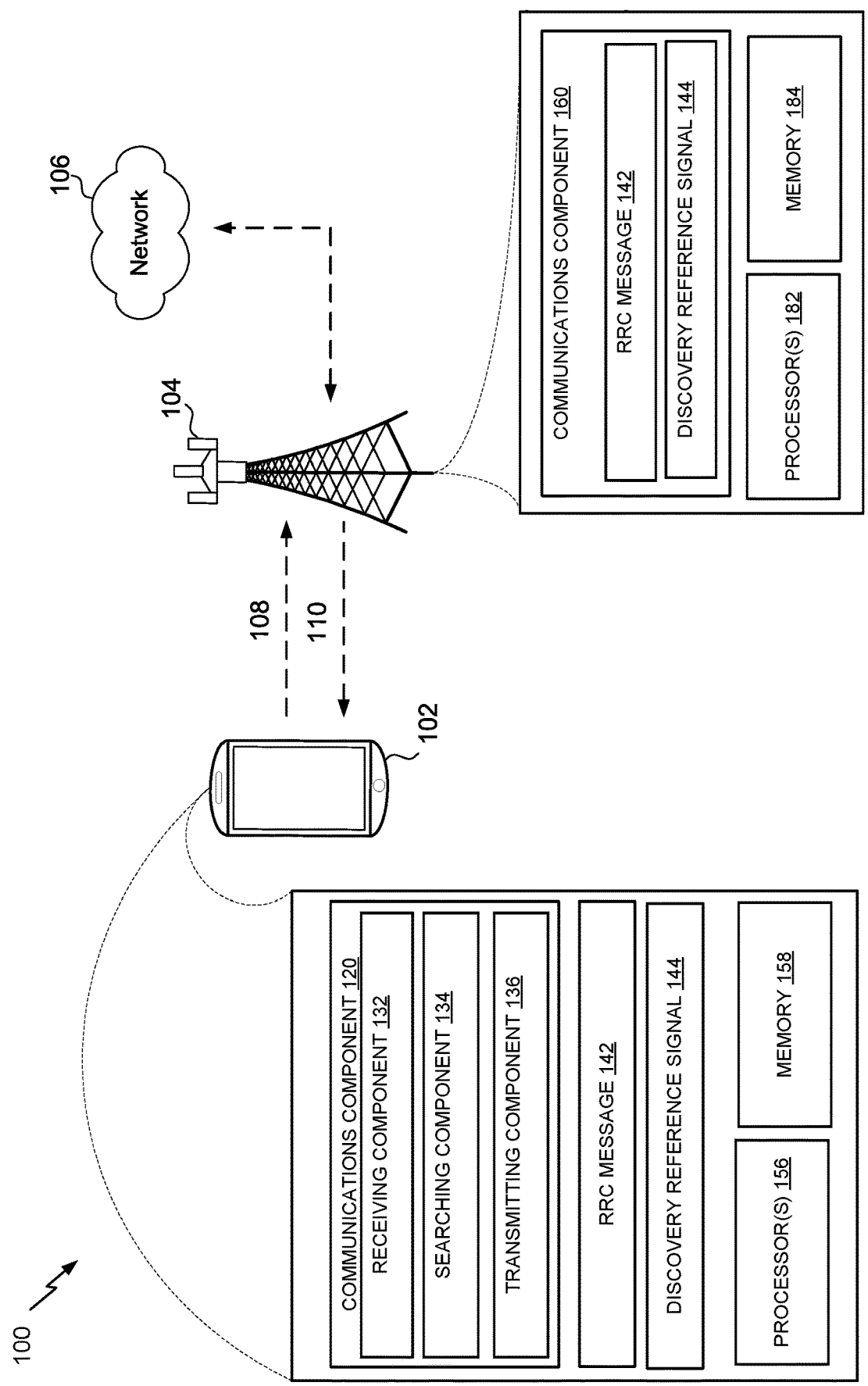
FIG. 1 is schematic diagram illustrating an example of a communication network including an aspect of wireless communications in an unlicensed spectrum, in accordance with various aspects of the present disclosure.

The present aspects generally relate to wireless, e.g., LTE LAA communications in the unlicensed spectrum. For example, prior to gaining access to, and communicating over, a channel in an unlicensed radio frequency spectrum, an eNB or a user equipment (UE) may perform a listen before talk (LBT) procedure to determine whether the resources are being used by other devices in the same or another radio access technology (RAT). An LBT procedure may include performing a clear channel assessment (CCA) procedure to determine whether a channel in the unlicensed radio frequency spectrum band is available. The CCA procedure is composed of two related functions, carrier sense (CS) and energy detection (ED). Carrier sense refers to the ability of a receiver to detect and decode an incoming Wi-Fi signal preamble. Energy detection (ED) refers to the ability of the receiver to detect Wi-Fi energy level present on the current channel based on the noise floor, ambient energy, interference sources, and unidentifiable Wi-Fi transmissions that may have been corrupted and can no longer be decoded. Unlike carrier sense, which can determine the exact length of time the medium will be busy with the current frame, energy detection must sample the medium every slot to determine if the energy still exists. When it is determined that the channel of the unlicensed radio frequency spectrum is not available (e.g., because another device is already using the channel of the unlicensed radio frequency spectrum), a CCA procedure may be performed for the channel again at a later time.

Before a UE may communicate with an eNB, the UE may need to discover or acquire the cell associated with the eNB. After the UE discovers the cell, the UE may need to periodically synchronize with the cell (or eNB) in order to properly communicate with, and decode communications from, the eNB. In some examples, an eNB may transmit a synchronization signal and a UE may receive and decode the synchronization signal to discover and/or synchronize with the eNB. Most transmissions on carriers in unlicensed spectrum are made by transmitters after first complying with the LBT protocols. However, in some wireless networks, LTE LAA base stations operating in the unlicensed spectrum may use channels that are different in bandwidth when compared to the bandwidth of the channels used in Wi-Fi communications. Techniques for such coexistence in the unlicensed spectrum are disclosed herein.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 is a diagram illustrating an example of a telecommunications network system 100 in accordance with an aspect of the present disclosure, including at least one UE 102 in communication coverage of at least one eNB 104. UE 102 may include one or more processors 156 and memory 158, that may operate in combination with communications component 120 for wireless communications with eNB 104. Similarly, eNB 104 may include one or more processors 182 and memory 184, that may operate in combination with communications component 160 to transmit a radio resource control (RRC) message 142 and/or a discovery reference signal (DRS) 144 for wireless communications. UE 102 may communicate with eNB 104 over uplink (UL) 108 for transmissions from UE 102 to eNB 104 and/or downlink (DL) 110 for transmissions from eNB 104 to UE 102.

eNB 104 may be configured to support carrier aggregation (CA). That is, eNB 104 may be configured to include a primary cell (Pcell) and one or more secondary cells (Scell). Additionally, one or more of the Scells of eNB 104 may be configured to operate in the unlicensed spectrum. For example, in one implementation, eNB 104 may be configured to operate in the licensed and/or unlicensed spectrum. Such an implementation may include eNB 104 to be configured with one or more Scells that can carry data transmissions on UL 108 and/or DL 110 over a carrier (e.g., a frequency carrier) with a frequency located in the unlicensed spectrum and/or with assistance from the Pcell configured with a frequency in the licensed spectrum. As the Pcell of eNB 104 is configured with a frequency in the licensed spectrum, the Pcell of eNB 104 generally manages control signaling and/or other important data traffic, e.g., real-time data traffic.

In one implementation, UE 102 and/or communications component 120 may receive a RRC message 142 from eNB 104. RRC message 142 may include information (e.g., referred to as channel information) that indicates one or more channels (e.g., frequency channels) within a carrier located in the unlicensed spectrum. For example, RRC message 142 may include channel information that indicates location of one or more channels (e.g., channel 1, channel 2, and/or channel 3) within a carrier, e.g., carrier 1, wherein the frequency of the carrier is located in the unlicensed spectrum. UE 102, upon receiving RRC message 142, may perform a search (e.g., cell search) for DRS 144 based at least on the channel information received in RRC message 142. That is, UE 102 may perform a cell search for detecting DRS 144 associated with the one or more channels identified in RRC message 142.

One or more Scells of eNB 104 may operate in the unlicensed spectrum which may be shared with other devices operating on a different radio access technology (RAT), for example, Wi-Fi devices, which may be configured to use/utilize 20 MHz channels for communications. However, eNB 104 configured with Scells operating in the unlicensed spectrum may be configured with channels that may be smaller in bandwidth, e.g., 5 MHz and/or 10 MHz. In such a scenario, eNB 104, via RRC message 142, may indicate to UE 102 the location of the one or more channels that eNB 104 has configured UE 102 for wireless communications in the unlicensed spectrum.

For example, in one implementation, eNB 104 may configure one or more 10 MHz channels within a 20 MHz carrier. The 10 MHz channels may occupy left half, right half, or middle half of the 20 MHz carrier, as described below in detail in reference to FIG. 2. eNB 104 may indicate the location of one or more 10 MHz channels to UE 102 via RRC message 142. This allows UE 102 to search for a Scell (associated with the channel) at the correct location (e.g., left half, right half, middle half of the 20 MHz carrier). That is, eNB 104 may configure one or more Scells with a channel bandwidth of 10 MHz and indicate the location of the Scell associated with the 10 MHz channel to UE 102 via RRC message 142 so that UE 102 may perform a search at the correct location. In other words, eNB 104 may configure one or more Scells to operate with a 10 MHz channel even though the Scell can support communications with 20 MHz channels (e.g., full bandwidth of the carrier). Additionally, eNB 104 may perform listen before talk (LBT) procedure in the full 20 MHz carrier even though the Scells may be configured with a 10 MHz channel as other RATs (e.g., Wi-Fi) may be utilizing the full 20 MHz carrier. That is, UE 102 may consider energy of the full 20 MHz carrier to detect and/or determine if the 10 MHz is idle or occupied for communications by UE 102. It should be noted that DL channels are typically configured as 20 MHz channels even though UL channels may be configured as 10 MHz (or 5 MHz) channels.

In one implementation, eNB 104 may transmit DRS 144 such that each 5 MHz channel of DRS 144 is decodable by UE 102. That is, UE 102 can decode DRS 144 by decoding a 5 MHz DRS transmission instead of needing the 10 MHz or 20 MHz DRS transmission for successful decoding DRS 144. This type of decoding may be referred to as self-decoding, and may allow UE 102 to decode information such as a scrambling sequence, enhanced system information block (eSIB) mapping, etc. based on DRS transmission in a 5 MHz channel. Additionally, based on the decoding of DRS 144, other eNBs and/or UEs may determine (e.g., infer) 5 MHz and/or 10 MHz channels within the 20 MHz carrier that are configured by eNB 104. Additionally, DRS 144 may contain information which may further indicate the location of the channel (e.g., left half, middle half, right half) in the carrier.

eNB 104 may configure a Scell of eNB 104 with a plurality of channels in the unlicensed spectrum. For example, a Scell of eNB 104 may be configured with two 10 MHz channels, four 5 MHz channels, or one 10 MHz channel and two 5 MHz channels. This provides flexibility to network operators in the configuration of channels (e.g., frequencies) for Scells operating in the unlicensed spectrum and may improve the performance of system 100.

For example, NB 104 may configure two 10 MHz channels for UL transmissions from UE 102 to eNB 104. The two 10 MHz channels may be configured with different number and/or structure of resource blocks (RBs) per interlace (e.g., 5 or 10 RBs per interlace) on the UL. That is, the number and/or the structure of RBs per interlace may be different between the two channels. This allows eNB 104 to schedule more UEs in a channel and/or improve the probability of at least some of the UEs clearing the LBT procedure (e.g., odds of finding a channel that is not being used by another RAT, e.g., Wi-Fi). For example, eNB 104 may schedule 10 UEs on a 10 MHz channel when compared to scheduling 10 UEs on a 20 MHz carrier when eNB 104 configures one 20 MHz channel. Further, the scheduling of UEs on a 10 MHz channel allows shorter packet transmissions (e.g., packets that could be transmitted in a smaller channel) resulting in spectrum efficiency and/or performance of system 100.

In one implementation, UE 102 may transmit at full UL power as UL power control may be absent UE 102 when UE 102 is operating in the unlicensed spectrum. The transmission at full power helps UE 102 suppress any potential interferers associated with LBT. However, this may have unintended consequences as the received power at eNB 104 for UEs located physically closer to eNB 104 is much higher than the received power at eNB 104 for UEs located physically farther away from eNB 104. This may be also referred to as "near" and 'far away" problem. The configuration of smaller channels, e.g., 10 MHz channels, may provide flexibility to eNB 104 to divide the UEs in communication with eNB 104 into at least two groups, a first group and a second group. eNB 104 may indicate to UEs located near (e.g., satisfies a threshold distance or a power) to eNB 104 to use one channel (e.g., channel 1) and/or UEs located far away (e.g., does not satisfy the threshold distance or power) to use another channel (e.g., channel 2) to manage interference caused due to near/far away problem.

eNB 104 may use media access control (MAC) layer signaling to switch between channels at UE 102. For example, when eNB 104 configures UE 102 with at least two channels (e.g., channel 1 and channel 2), eNB 104 may use MAC signaling to instruct UE 102 to switch between the channels. This provides for flexibility when managing interference or sharing the channels with other Wi-Fi devices. Although, RRC signaling may be used for such signaling, MAC layer signaling is generally faster than RRC signaling due to the higher processing times of RRC messages. In one implementation, eNB 104 may configure two 10 MHz channels (e.g., channel 1 and channel 2), and initially instruct UE 102 to use the left 10 MHz channel (e.g., channel 1) and later instruct UE 102 to switch to the right 10 MHz channel (e.g., channel 2) by transmitting a MAC layer message to UE 102. Additionally, downlink control information (DCI) signaling may be used for even faster switching, for example, by using a bit in the DCI signal to indicate which channel to use. In one implementation, a value of "0" may indicate a channel in the left half of the carrier (e.g., channel 1) and a value of "1" may indicate a channel in the right half of the carrier (e.g. channel 2). In an additional implementation, UE 102 may be configured to use a same hybrid automatic repeat request (HARQ) buffer to reduce complexity at UE 102 during the switching of the channels. That is, the same HARQ buffer is used for all channels located in the carrier.

UE 102 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 102 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. Additionally, eNB 104 may be a macrocell, picocell, femtocell, relay, Node B, mobile Node B, UE (e.g., communicating in peer-to-peer or ad-hoc mode with UE 102), or substantially any type of component that can communicate with UE 102 to provide wireless network access at UE 102.

eNB 104 may provide communication coverage for a particular geographic area. In 3GPP, the term "cell" can refer to a coverage area of an eNB and/or an eNB subsystem serving the coverage area, depending on the context in which the term is used. An eNB (e.g., base station 104) may provide communication coverage for a small cell and/or other types of cell. The term "small cell" (or "small coverage cell"), as used herein, may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. An eNB for a macro cell may be referred to as a macro eNB. An eNB for a pico cell may be referred to as a pico eNB. An eNB for a femto cell may be referred to as a femto eNB or a home eNB.

In one implementation, UE 102 and/or communications component 120 may be configured for LTE communications in the unlicensed spectrum (in addition to the communications in the licensed spectrum) to include a receiving component 132 to receive a radio resource control (RRC) message from an eNB, wherein the RRC message includes channel information that indicates a channel within a carrier located in an unlicensed spectrum and associated with a secondary cell (Scell) of the eNB for uplink transmissions to the eNB. UE 102 and/or communications component 120 are further configured to include a searching component 134 for searching for a discovery reference signal (DRS) associated with the Scell based at least on the information received in the RRC message, and/or a transmitting component 136 for transmitting on the channel detected during the search. In an additional implementation, eNB 104 may include a communications component 160 for transmitting a RRC message 142 and/or a discovery reference signal (DRS) 144 to UE 102.

Figure 2:
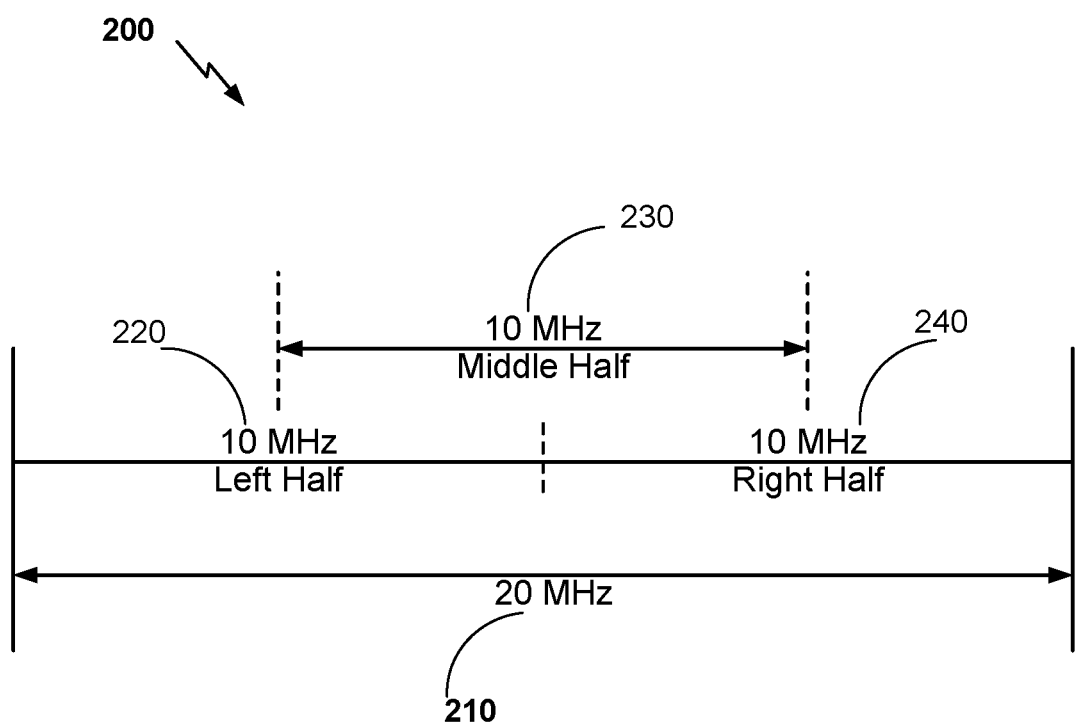
FIG. 2 is a schematic diagram illustrating an example channel configuration for wireless communications in an unlicensed spectrum, in accordance with various aspects of the present disclosure.

FIG. 2 illustrates an example of channel configuration 200 within a carrier located in the unlicensed spectrum, in accordance with various aspects of the present disclosure.

For example, in one implementation, eNB 104 may indicate channels 220, 230, and/or 240 to UE 102 for communication between UE 102 and eNB 104. eNB 104 may indicate the location of the channels (within the carriers) via RRC message 142 and/or DRS 144. The channels may be located within a carrier 210 which may be, for example, 20 MHz in bandwidth. eNB 104 may indicate to UE 102 that each of channels 220, 230, and/or 240 may be a 10 MHz channel, and may respectively occupy left half, middle half, or right half of carrier 210 as illustrated in FIG. 2. It should be also noted that the channels are not just limited to the configuration illustrated in FIG. 2. For instance, eNB 104 may define four 5 MHz channels located within carrier 210, or one 10 MHz channel and two 5 MHz channels.

Figure 3:
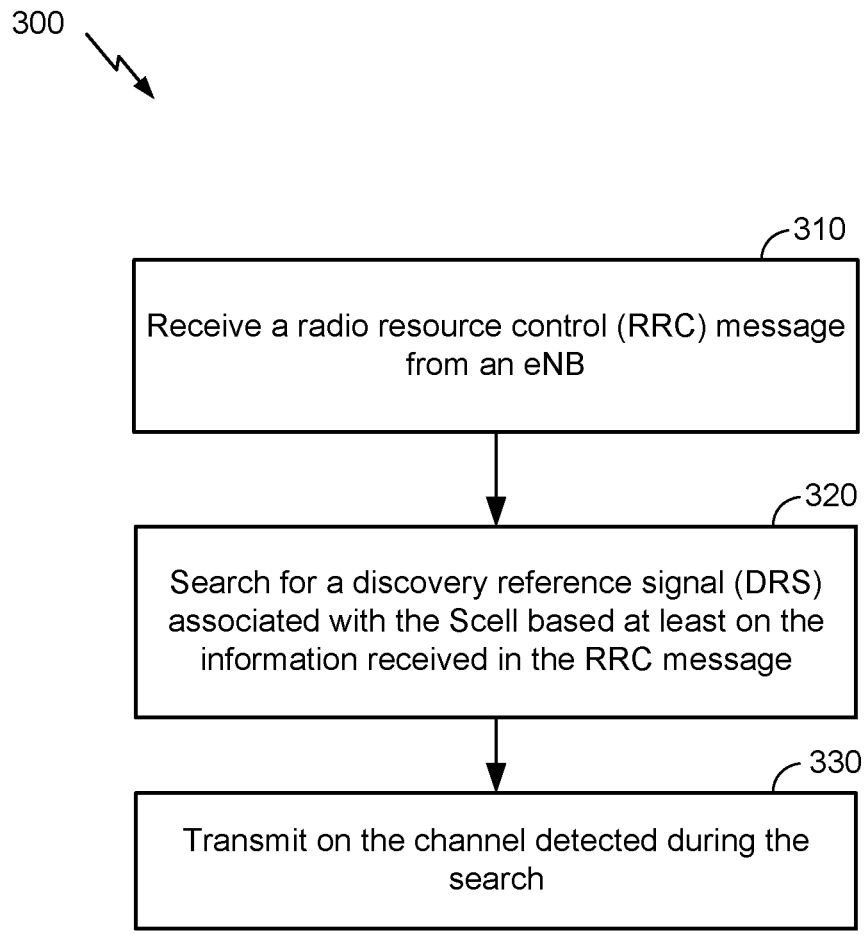
FIG. 3 is a flow diagram illustrating an example method for wireless communications in an unlicensed spectrum, in accordance with various aspects of the present disclosure.

Referring to FIG. 3, in operation, a UE such as UE 102 (FIG. 1) may perform an aspect of method 300 for wireless communications in an unlicensed spectrum. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 310, method 300 includes receiving, at a user equipment (UE), a radio resource control (RRC) message from an eNB, wherein the RRC message includes channel information that indicates a channel within a carrier located in an unlicensed spectrum and associated with a secondary cell (Scell) of the eNB for uplink transmissions to the eNB, and wherein a bandwidth of the channel is smaller than a bandwidth of the carrier. For example, in an aspect UE 102 and/or communications component 120 may include a specially programmed processor module, or a processor executing specially programmed code stored in a memory, to receive RRC message 142 from eNB 104. RRC message 142 may indicate to UE 102 a channel (e.g., channel 1 (202) located in left half of carrier 210 in the unlicensed spectrum is associated with a Scell of eNB 104 for uplink transmissions with eNB 104. It should be noted that channel 1 is an example, and eNB 104 may indicate any channel to UE 102, for example, channel 2 240 and/or channel 3 230. In an aspect, UE 102 and/or communications component 120 may include a receiving component 132 (FIG. 1) to perform this functionality.

In an aspect, at block 320, method 300 includes searching, by the UE, for a discovery reference signal (DRS) associated with the Scell based at least on the information received in the RRC message. For example, in an aspect UE 102 and/or communications component 120 may include a specially programmed processor module, or a processor executing specially programmed code stored in a memory, to search for DRS 144 associated with the Scell based at least on the channel information received in RRC message 142. That is, UE 102 searches for DRS 144 based at least on the location of the channel indicated in the channel information from eNB 104. In an aspect, UE 102 and/or communications component 120 may include a searching component 134 (FIG. 1) to perform this functionality.

In an aspect, at block 330, method 300 includes transmitting, from the UE, on the channel detected during the search. For example, in an aspect UE 102 and/or communications component 120 may include a specially programmed processor module, or a processor executing specially programmed code stored in a memory, to transmit data from the UE 102 to eNB 104 on the channel (e.g., channel 1) detected during the search. In an aspect, UE 102 and/or communications component 120 may include a transmitting component 136 (FIG. 1) to perform this functionality.

Figure 4:
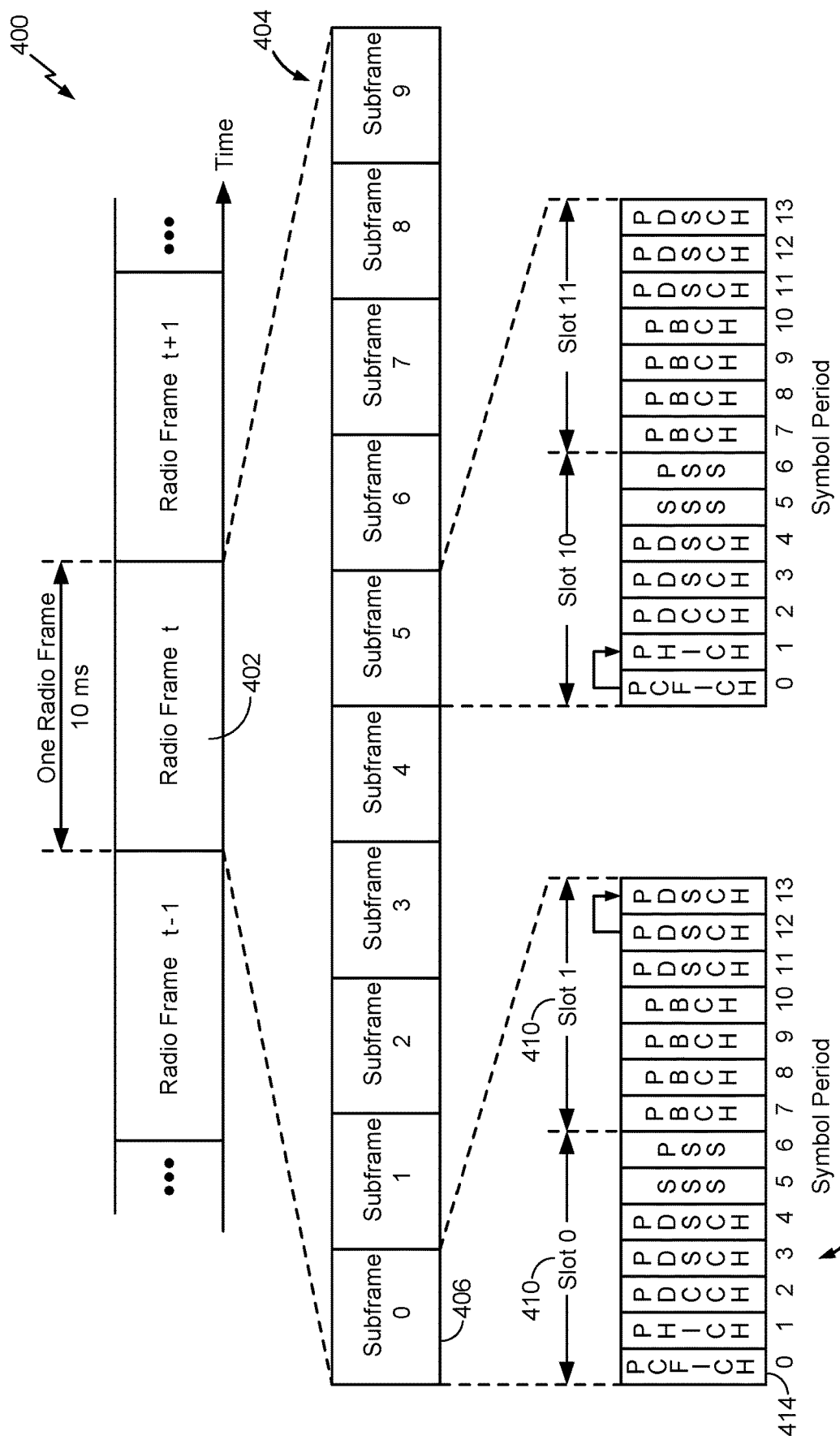
FIG. 4 shows a downlink frame structure used in LTE, in accordance with various aspects of the present disclosure.
Figure 6:
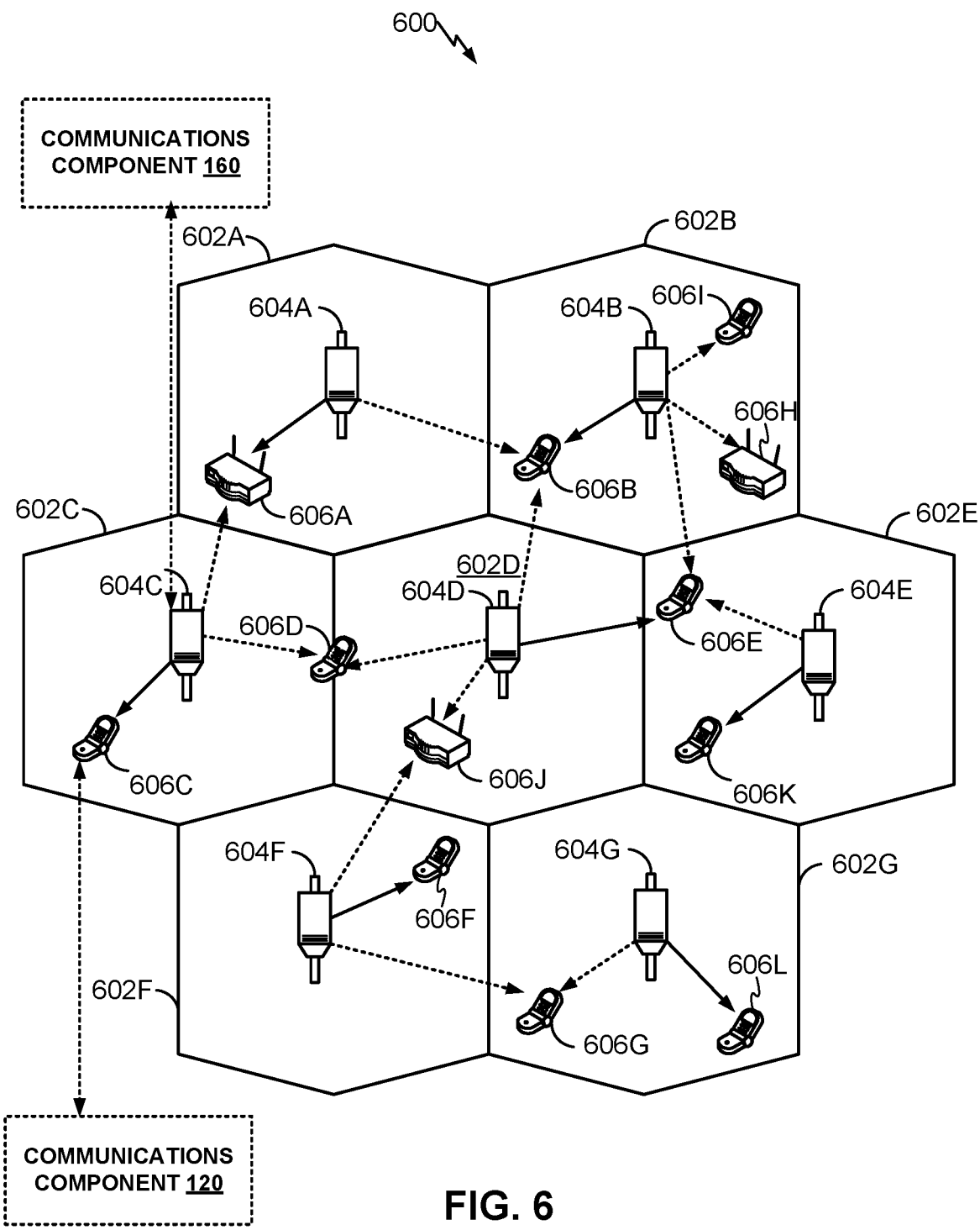
FIG. 6 is a simplified diagram of a wireless communication system, in accordance with various aspects of the present disclosure.

FIG. 4 shows a downlink frame structure 400 used in LTE, which may be used in sending communications, e.g., RRC message 142 and/or DRS 144 from base station 104 (FIG. 1) to UE 102 (FIG. 1). The transmission timeline for the downlink may be partitioned into units of radio frames 402. Each radio frame may have a predetermined duration (e.g., 10 milliseconds (ms)) and may be partitioned into 10 subframes 404 with indices of 0 through 9. Each subframe may include two slots, e.g., slots 410. Each radio frame may thus include 20 slots with indices of 0 through 19. Each slot may include L symbol periods, e.g., 7 symbol periods 412 for a normal cyclic prefix (CP), as shown in FIG. 4, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, the access point (referred to as an eNB), which may correspond to eNB (FIG. 1), may send a Primary Synchronization Signal (PSS) and a Secondary Synchronization Signal (SSS), which may be DRS 144 for each cell (e.g., Pcell and/or Scell) in eNB 104. The primary and secondary synchronization signals may be sent in symbol periods 6 and 5, respectively, in each of subframes 0 and 5 of each radio frame with the normal cyclic prefix. The synchronization signals may be used by the access terminals, e.g., UE 102 (FIG. 1) for cell detection and acquisition.

eNB 104 may send a Physical Broadcast Channel (PBCH) in symbol periods 0 to 3 in slot 1 of subframe 0. The PBCH may carry certain system information.

eNB 104 may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

eNB 104 may send a Physical Control Format Indicator Channel (PCFICH) in only a portion of the first symbol period of each subframe, although depicted in the entire first symbol period in FIG. 4. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 4, M=3. eNB may send a Physical HARQ Indicator Channel (PHICH) and a Physical Downlink Control Channel (PDCCH) in the first M symbol periods of each subframe (M=3 in FIG. 4). The PHICH may carry information to support hybrid automatic retransmission (HARQ). The PDCCH may carry information on resource allocation for UEs and control information for downlink channels. Although not shown in the first symbol period in FIG. 4, it is understood that the PDCCH and PHICH may also be included in the first symbol period. Similarly, the PHICH and PDCCH may also both be in the second and third symbol periods, although not shown that way in FIG. 4. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search. A UE may be within the coverage of multiple eNBs. One of these eNBs may be selected to serve the UE. The serving eNB may be selected based on various criteria such as received power, path loss, signal-to-noise ratio (SNR), etc.

Figure 5:
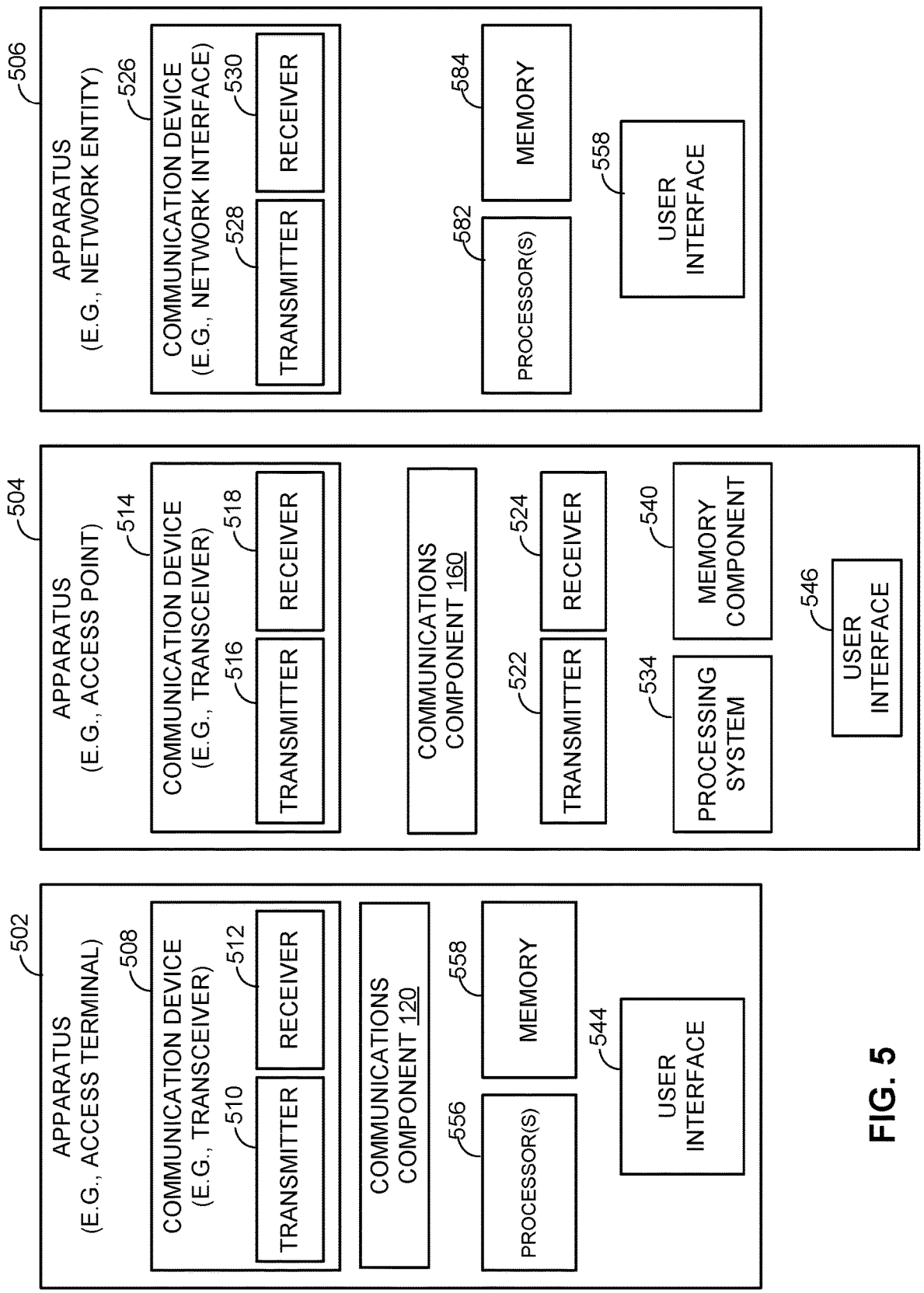
FIG. 5 is a block diagram of several sample aspects of components, in accordance with various aspects of the present disclosure.

FIG. 5 illustrates several sample components (represented by corresponding blocks) that may be incorporated into an apparatus 502 (e.g., an access terminal), which may correspond to UE 102 including communications component 120 (FIG. 1), an apparatus 504 (e.g., an access point), which may correspond to eNB 104 (FIG. 1) including communications component 160 (FIG. 1), and an apparatus 506 (e.g., a network), which may correspond to network 106 (FIG. 1), to support operations as taught herein. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 502 and the apparatus 504 each include at least one wireless communication device (represented by the communication devices 508 and 514) for communicating with other nodes via at least one designated radio access technology. Each communication device 508 includes at least one transmitter (represented by the transmitter 510) for transmitting and encoding signals (e.g., messages, indications, information, and so on) and at least one receiver (represented by the receiver 512) for receiving and decoding signals (e.g., messages, indications, information, pilots, and so on). Similarly, each communication device 514 includes at least one transmitter (represented by the transmitter 516) for transmitting signals (e.g., messages, indications, information, pilots, and so on) and at least one receiver (represented by the receiver 518) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 504 comprises a network listen module.

The apparatus 506 (and the apparatus 504 if it is not a relay access point) includes at least one communication device (represented by the communication device 526) for communicating with other nodes. For example, the communication device 526 may comprise a network interface that is configured to communicate with one or more network entities via a wire-based or wireless backhaul. In some aspects, the communication device 526 may be implemented as a transceiver configured to support wire-based or wireless signal communication. This communication may involve, for example, sending and receiving: messages, parameters, or other types of information. Accordingly, in the example of FIG. 5, the communication device 526 is shown as comprising a transmitter 528 and a receiver 530.

The apparatuses 502, 504, and 506 may also include other components that may be used in conjunction with communication adaptation operations as taught herein. The apparatus 502 includes one or more processor(s) 556 for providing functionality relating to, for example, communicating with an access point to support communication adaptation as taught herein and for providing other processing functionality. The apparatus 504 includes a processing system 534 for providing functionality relating to, for example, communication adaptation as taught herein and for providing other processing functionality. The apparatus 506 includes one or more processor(s) 582 for providing functionality relating to, for example, communication adaptation as taught herein and for providing other processing functionality. The apparatuses 502, 504, and 506 include memory devices 558, 540, and 584 (e.g., each including a memory device), respectively, for maintaining information (e.g., information indicative of reserved resources, thresholds, parameters, and so on). In addition, the apparatuses 502, 504, and 506 include user interface devices 544, 546, and 548, respectively, for providing indications (e.g., audible and/or visual indications) to a user and/or for receiving user input (e.g., upon user actuation of a sensing device such a keypad, a touch screen, a microphone, and so on).

For convenience, the apparatus 502 is shown in FIG. 5 as including components that may be used in the various examples described herein. In practice, the illustrated blocks may have different functionality in different aspects.

The components of FIG. 5 may be implemented in various ways. In some implementations, the components of FIG. 5 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 508, 556, 558, and 544 may be implemented by processor and memory component(s) of the apparatus 502 (e.g., by execution of appropriate code and/or by appropriate configuration of processor components). Similarly, some or all of the functionality represented by blocks 514, 534, 540, and 546 may be implemented by processor and memory component (s) of the apparatus 504 (e.g., by execution of appropriate code and/or by appropriate configuration of processor components). Also, some or all of the functionality represented by blocks 526, 582, 584, and 548 may be implemented by processor and memory component(s) of the apparatus 506 (e.g., by execution of appropriate code and/or by appropriate configuration of processor components).

Some of the access points referred to herein may comprise low-power access points. In a typical network, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells.

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a third generation (3G) network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

FIG. 6 illustrates a wireless communication system 600, configured to support one or more access terminals, e.g., UE 102, having respective communications components 120 that operate to enable the access terminals support LTE communications in the unlicensed frequency spectrum. The system 600 provides communication for multiple cells 602, such as, for example, macro cells 602A-602G, with each cell being serviced by a corresponding access point 604 (e.g., access points 604A-604G), which may correspond to eNB 104 (FIG. 1). As shown in FIG. 6, access terminals 606 (e.g., access terminals 606A-606L), which may correspond to UE 102 including communications component 120 (FIG. 1), illustrated here as being associated with UE 606C, may be dispersed at various locations throughout the system over time. Each access terminal 606 may communicate with one or more access points 604 on a forward link (FL) and/or a reverse link (RL) at a given moment, depending upon whether the access terminal 606 is active and whether it is in soft handoff, for example. The wireless communication system 600 may provide service over a large geographic region. For example, macro cells 602A-602G may cover a few blocks in a neighborhood or several miles in a rural environment.

Figure 7:
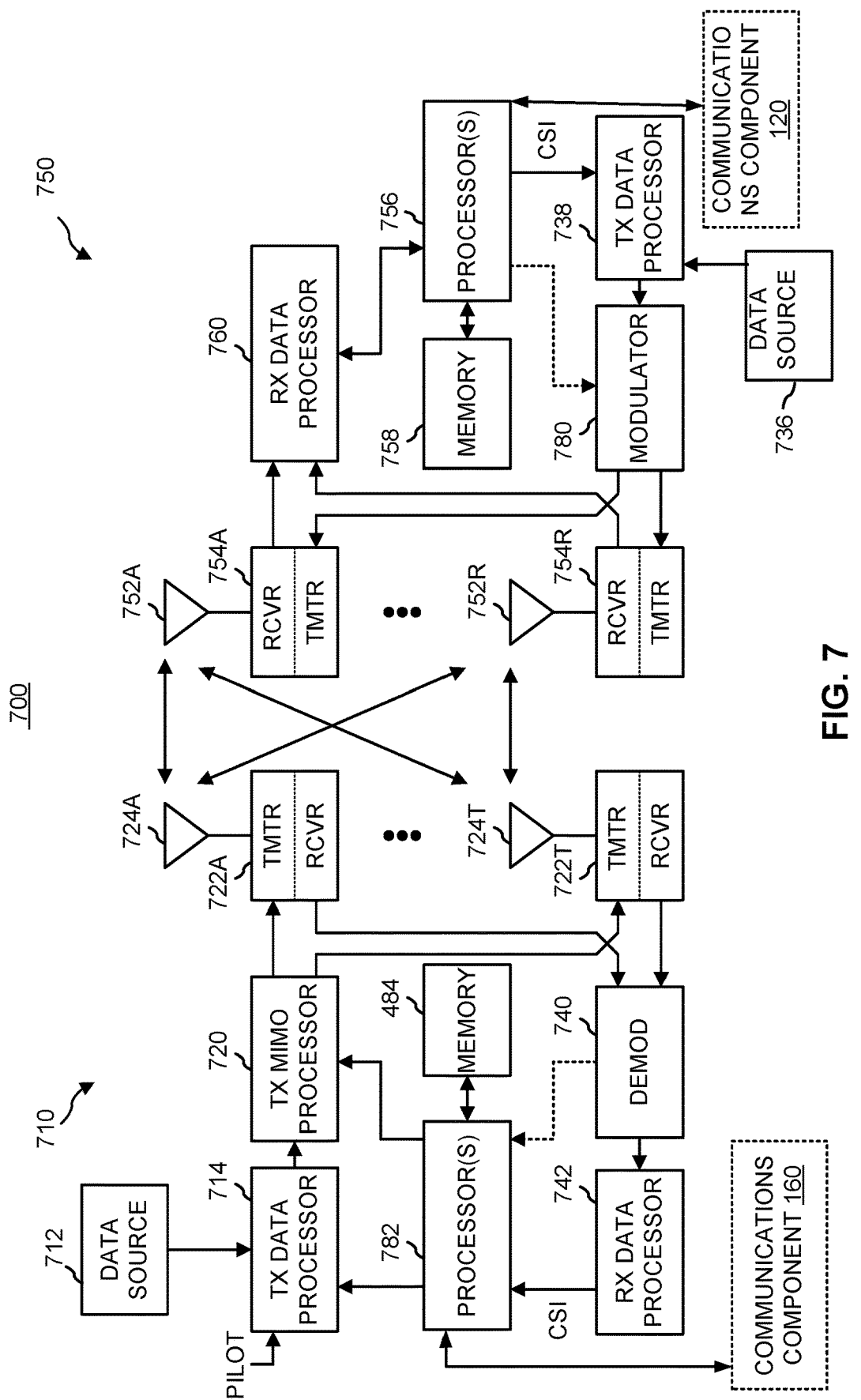
FIG. 7 is another simplified diagram of a wireless communication system, in accordance with various aspects of the present disclosure.

FIG. 7 illustrates in more detail the components of a wireless device 710, which may correspond to base station 710, which may correspond to eNB 104 (FIG. 1), and a wireless device 750, which may correspond to UE 102 (FIG. 1) including communications component 120 (FIG. 1) of a sample communication system 700 that may be adapted as described herein. At the device 710, traffic data for a number of data streams is provided from a data source 712 to a transmit (TX) data processor 714. Each data stream may then be transmitted over a respective transmit antenna.

The TX data processor 714 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 482. A data memory 484 may store program code, data, and other information used by the processor 482 or other components of the device 710.

The modulation symbols for all data streams are then provided to a TX MIMO processor 720, which may further process the modulation symbols (e.g., for OFDM). The TX MIMO processor 720 then provides NT modulation symbol streams to NT transceivers (XCVR) 722A through 722T. In some aspects, the TX MIMO processor 720 applies beam-forming weights to the symbols of the data streams and to the antenna from which the symbol is being transmitted.

Each transceiver 722 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 722A through 1222T are then transmitted from NT antennas 724A through 724T, respectively.

At the device 750, the transmitted modulated signals are received by NR antennas 752A through 752R and the received signal from each antenna 752 is provided to a respective transceiver (XCVR) 754A through 754R. Each transceiver 754 conditions (e.g., filters, amplifies, and down-converts) a respective received signal, digitizes the conditioned signal to provide samples, and further processes the samples to provide a corresponding "received" symbol stream.

A receive (RX) data processor 760 then receives and processes the NR received symbol streams from NR transceivers 754 based on a particular receiver processing technique to provide NT "detected" symbol streams. The RX data processor 760 then demodulates, deinterleaves, and decodes each detected symbol stream to recover the traffic data for the data stream. The processing by the RX data processor 760 is complementary to that performed by the TX MIMO processor 720 and the TX data processor 714 at the device 710.

A processor 756 periodically determines which pre-coding matrix to use (discussed below). The processor 756 formulates a reverse link message comprising a matrix index portion and a rank value portion. A data memory 758 may store program code, data, and other information used by the processor 756 or other components of the device 750.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by the transceivers 754A through 754R, and transmitted back to the device 710.

At the device 710, the modulated signals from the device 750 are received by the antennas 724, conditioned by the transceivers 722, demodulated by a demodulator (DEMOD) 740, and processed by a RX data processor 742 to extract the reverse link message transmitted by the device 750. The processor 782 then determines which pre-coding matrix to use for determining the beam-forming weights then processes the extracted message.

It will be appreciated that for each device 710 and 750 the functionality of two or more of the described components may be provided by a single component. It will be also be appreciated that the various communication components illustrated in FIG. 7 and described above may be further configured as appropriate to perform communication adaptation as taught herein. For example, the processors 782/756 may cooperate with the memories 784/758 and/or other components of the respective devices 710/750 to perform the communication adaptation as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium.

In the alternative, the storage medium may be integral to the processor.

Accordingly, an aspect of the disclosure can include a computer readable medium embodying a method for scheduling a first set of subframes in a frame duration for traffic based at least in part on a first configuration for communications in an unlicensed frequency band; scheduling, based at least in part on the first configuration, a second set of subframes in the frame duration for detection of a primary user of the unlicensed frequency band (e.g., radar detection); and adjusting a number of subframes in the first and second set of subframes based on a second configuration for communications, wherein the second configuration for communications is identified based on a type of primary user being detected (e.g., radar type). Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communications, comprising:
   receiving, at a user equipment (UE), a radio resource control (RRC) message from a base station, wherein the RRC message includes channel information that indicates a channel within a carrier that is located in an unlicensed spectrum and configured for a secondary cell (Scell) of the base station for uplink transmissions to the base station, and wherein a bandwidth of the channel is smaller than a bandwidth of the carrier;
   searching, by the UE, for a discovery reference signal (DRS) associated with the Scell based at least on the information received in the RRC message, wherein said searching for the DRS further comprises
   decoding the DRS within a smaller bandwidth than the bandwidth of the channel, wherein the DRS contains information indicating a location of the channel within the carrier; and
   transmitting, from the UE, on the channel detected during the search based on the DRS.

2. The method of claim 1, wherein the bandwidth of the channel is half of the bandwidth of the carrier; and wherein the channel occupies a left half, a right half, or a middle half of a bandwidth of the carrier and the RRC message indicates a location of the channel within the carrier.

3. The method of claim 2, wherein the channel is 10 MHz in bandwidth and the carrier is 20 MHz in bandwidth.

4. The method of claim 3, wherein the DRS is received over the 10 MHz channel or the 20 MHz carrier.

5. The method of claim 4, wherein the DRS is self-decodable within the smaller bandwidth.

6. The method of claim 1, wherein the channel information indicates at least two channels, a first channel and a second channel, and further comprising:
   switching between the first and the second channel based at least on a media access control (MAC) layer message or a downlink control information (DCI) message received from the base station.

7. The method of claim 6, wherein a same hybrid automatic repeat request (HARM) buffer at a MAC layer of the UE is used for the at least two channels.

8. The method of claim 6, wherein the transmitting further comprises:
   transmitting packets of a first size on the first channel and packets of a second size on the second channel, wherein the first size is smaller than the second size.

9. The method of claim 6, wherein the UE is transmitting at a full power, and wherein the UE transmits on the first channel when the UE is located closer to the base station and transmits on the second channel when the UE is located far away from the base station.

10. The method of claim 1, further comprising:
    determining, at the UE, whether the UE can transmit on the channel by performing a listen before talk (LBT) on the carrier prior to transmitting from the UE.

11. An apparatus for wireless communications, comprising:
    means for receiving, at a user equipment (UE), a radio resource control (RRC) message from a base station, wherein the RRC message includes channel information that indicates a channel within a carrier that is located in an unlicensed spectrum and configured for a secondary cell (Scell) of the base station for uplink transmissions to the base station, and wherein a bandwidth of the channel is smaller than a bandwidth of the carrier;
    means for searching, by the UE, for a discovery reference signal (DRS) associated with the Scell based at least on the information received in the RRC message, wherein said means for searching for the DRS further comprises
    means for decoding the DRS within a smaller bandwidth than the bandwidth of the channel, wherein the DRS contains information indicating a location of the channel within the carrier; and
    means for transmitting, from the UE, on the channel detected during the search based on the DRS.

12. The apparatus of claim 11, wherein the bandwidth of the channel is half of the bandwidth of the carrier; and wherein the channel occupies a left half, a right half, or a middle half of a bandwidth of the carrier and the RRC message indicates a location of the channel within the carrier.

13. The apparatus of claim 12, wherein the channel is 10 MHz in bandwidth and the carrier is 20 MHz in bandwidth.

14. The apparatus of claim 13, wherein the DRS is received over the 10 MHz channel or the 20 MHz carrier.

15. The apparatus of claim 11, further comprising:
    means for determining, at the UE, whether the UE can transmit on the channel by performing a listen before talk (LBT) on the carrier prior to transmitting from the UE.

16. A computer readable medium storing computer executable code for wireless communications, comprising:

code for receiving, at a user equipment (UE), a radio resource control (RRC) message from a base station, wherein the RRC message includes channel information that indicates a channel within a carrier that is located in an unlicensed spectrum and configured for a secondary cell (Scell) of the base station for uplink transmissions to the base station, and wherein a bandwidth of the channel is smaller than a bandwidth of the carrier;

code for searching, by the UE, for a discovery reference signal (DRS) associated with the Scell based at least on the information received in the RRC message, wherein said code for searching for the DRS further comprises code for decoding the DRS within a smaller bandwidth than the bandwidth of the channel, wherein the DRS contains information indicating a location of the channel within the carrier; and code for transmitting, from the UE, on the channel detected during the search based on the DRS.

17. The computer readable medium of claim 16, wherein the bandwidth of the channel is half of the bandwidth of the carrier; and wherein the channel occupies a left half, a right half, or a middle half of a bandwidth of the carrier and the RRC message indicates a location of the channel within the carrier.

18. The computer readable medium of claim 17, wherein the channel is 10 MHz in bandwidth and the carrier is 20 MHz in bandwidth.

19. The computer readable medium of claim 18, wherein the DRS is received over the 10 MHz channel or the 20 MHz carrier.

20. The computer readable medium of claim 19, wherein the DRS is self-decodable within the smaller bandwidth.

21. An apparatus for wireless communications, comprising:

a memory configured to store data; and one or more processors communicatively coupled with the memory, wherein the one or more processors and the memory are configured to:

receive, at a user equipment (UE), a radio resource control (RRC) message from a base station, wherein the RRC message includes channel information that indicates a channel within a carrier that is located in an unlicensed spectrum and configured for a secondary cell (Scell) of the base station for uplink transmissions to the base station, and wherein a bandwidth of the channel is smaller than a bandwidth of the carrier;

search, by the UE, for a discovery reference signal (DRS) associated with the Scell based at least on the information received in the RRC message, wherein to search for the DRS further comprises the one or more processors and the memory configured to decode the DRS within a smaller bandwidth than the bandwidth of the channel, wherein the DRS contains information indicating a location of the channel within the carrier; and transmit, from the UE, on the channel detected during the search based on the DRS.

22. The apparatus of claim 21, wherein the bandwidth of the channel is half of the bandwidth of the carrier; and wherein the channel occupies a left half, a right half, or a middle half of a bandwidth of the carrier and the RRC message indicates a location of the channel within the carrier.

23. The apparatus of claim 22, wherein the channel is 10 MHz in bandwidth and the carrier is 20 MHz in bandwidth.

24. The apparatus of claim 23, wherein the DRS is received over the 10 MHz channel or the 20 MHz carrier.

25. The apparatus of claim 24, wherein the DRS is self-decodable within the smaller bandwidth.

26. The apparatus of claim 21, wherein the channel information indicates at least two channels, a first channel and a second channel, and wherein the one or more processors and the memory are further configured to:

switching between the first and the second channel based at least on a media access control (MAC) layer message or a downlink control information (DCI) message received from the base station.

27. The apparatus of claim 26, wherein a same hybrid automatic repeat request (HARM) buffer at a MAC layer of the UE is used for the at least two channels.

28. The apparatus of claim 26, wherein the one or more processors and the memory are further configured to:

transmit packets of a first size on the first channel and packets of a second size on the second channel, wherein the first size is smaller than the second size.

29. The apparatus of claim 26, wherein the one or more processors and the memory are further configured to allow the UE to transmit at a full power, and wherein the UE transmits on the first channel when the UE is located closer to the base station and transmits on the second channel when the UE is located far away from the base station.

30. The apparatus of claim 21, wherein the one or more processors and the memory are further configured to:

determine, at the UE, whether the UE can transmit on the channel by performing a listen before talk (LBT) on the carrier prior to transmitting from the UE.

\* \* \* \* \*